US006609477B1

(12) United States Patent
White

(10) Patent No.: US 6,609,477 B1
(45) Date of Patent: Aug. 26, 2003

(54) MOBILE CATTLE HOSPITAL

(76) Inventor: Warren R. White, 126 Redwood, Hereford, TX (US) 79045

( * ) Notice: Subject to any disclaimer, the term of this patent is extended or adjusted under 35 U.S.C. 154(b) by 0 days.

(21) Appl. No.: 10/075,169

(22) Filed: Feb. 14, 2002

(65) Prior Publication Data

(65)

(51) Int. Cl.[7] ................................................ A01K 29/00

(52) U.S. Cl. ....................................... 119/512; 119/843

(58) Field of Search ................................ 119/512, 412, 119/400, 843, 732; 296/24.2

(56) References Cited

U.S. PATENT DOCUMENTS 3,929,353 A * 12/1975 Burleson et al. ......... 280/423.1
4,829,936 A * 5/1989 Mollhagen .................. 119/843
4,842,316 A * 6/1989 Lerma et al. ................. 296/22
RE33,959 E * 6/1992 Mollhagen .................. 119/843
5,381,757 A * 1/1995 Putney ....................... 119/512
5,924,385 A * 7/1999 Cossel ........................ 119/512
6,067,940 A * 5/2000 Holder ....................... 119/512
6,082,799 A * 7/2000 Marek ....................... 296/24.1
6,450,124 B1 * 9/2002 Calvert et al. .............. 119/512

OTHER PUBLICATIONS

Declaration of Warren R. White, dated Feb. 7, 2002.

* cited by examiner

*Primary Examiner*—Charles T. Jordan
*Assistant Examiner*—Kimberly S. Smith
(74) *Attorney, Agent, or Firm*—Mark E. Scott; Conley Rose, P.C.

(57) ABSTRACT

A mobile cattle hospital that is adapted to be located near a pen of cattle for treatment operations. A gooseneck trailer forms a platform upon which various gates, fence panels, a squeeze chute, a squeeze pen and supplies are located for the treatment, or working, operations. The trailer is further configured to selectively raise and lower, sitting on the ground during working operations to make easier the movement of the cattle on and off the trailer.

19 Claims, 5 Drawing Sheets

MOBILE CATTLE HOSPITAL

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention relate generally to a structure and related method for treating cattle in feedlot operations. More particularly, the preferred embodiments are directed to a mobile cattle hospital for treating pens of cattle close to the pens.

2. Background of the Invention

Feedlot operations, typically situated in corn producing areas of the country such as the Texas Panhandle, eastern Colorado, Nebraska and the like, are in the business of raising cattle in such a manner as to maximize weight gain and minimizing corresponding time for the weight gain. Part of this cattle feeding technique is keeping the cattle healthy by periodic medical treatments.

The majority of treatments to which the cattle are subjected take place in the first few days and weeks after the cattle enter the feedlot. In particular, it is customary that the entire pen of cattle, which may comprise more than a hundred head, depending on the size of the pen, need to be treated as a group. In the related art, after being unloaded from the truck, cattle are typically placed in a receiving pen relatively close to a processing barn or facility. Soon thereafter, the cattle are first-round processed, and this process may include receiving various disease fighting shots such as IVR, and also may include hormone implants. After the entire pen has been treated, the cattle are returned to the receiving area, again relatively close to the processing barn. The cattle are again processed after seven days in the feedlot, and this processing may include additional or booster shots of various medication.

Working or processing cattle in this manner is a group effort on the part of employees of the feedlot. In particular, a plurality of men are required to run the squeeze chute in the processing barn, the squeeze chute being a device which captures a single animal and then allows the men safe access for application of the implants and medicines. Additionally, another set of employees, typically on horses, is required to move the cattle from the receiving pen to the processing barn and back. After the second treatment, cattle are typically placed in a semi-permanent pen. While working the cattle as they enter the feedlot is the primary time that these operations take place, the cattle as a pen may, at any time during their stay in the feedlot, need additional treatment, in addition to individual treatments.

FIG. 1 shows an overhead view of a portion of a cattle feeding operation. In particular, the cattle are placed in pens 10A-I. Separating a series of pens, for example a first series 10D-F and a second series 10G-I, is a feed alley 12 through which feed trucks drive and place cattle feed in feed troughs 14. Between the pens on the other side is a working alley 16 (only one working alley shown in FIG. 1, but it is understood that between pens 10G-I and the corresponding set of pens to the right, there is another working alley, and so on). The working alley is generally used to relocate the cattle as well as providing access for cowboys on horses to enter and "ride" the pens looking for sick animals.

Thus, each time a pen of cattle needs to be treated, they are moved from either their receiving area pen or their semi-permanent pen into the working alley 16, and then they are driven to the processing barn (not shown). After processing is complete, the pen of cattle is then driven back through the working alley 16 into their respective semi-permanent pen. As can be appreciated from the discussion, moving the cattle from one location to another, whether it is the receiving pen or the semi-permanent pen, is labor-intensive. Additionally, each time the cattle are moved, they are stressed to some degree, which may affect weight gain.

Thus, what is needed in the art is a more efficient way to treat cattle in feedlot operations.

BRIEF SUMMARY OF SOME OF THE PREFERRED EMBODIMENTS

The problems noted above are solved in large part by a mobile cattle hospital that can be selectively located in a working alley proximate to a pen of cattle that need to be treated or worked. The mobile cattle hospital of the preferred embodiment comprises a trailer having a squeeze chute mounted thereon, which grasps and immobilizes the cattle for treatment, as well as a series of gates to selectively allow the treated cattle to exit. Additionally, in the preferred embodiments, a series of panels are mechanically connected near or on the back of the trailer, which allows for creation, proximate to the cattle pen, of a squeeze pen to allow handling and proper flow of the cattle to the squeeze chute. Cattle do not willingly proceed up steep ramps, inclines and the like, and thus in the preferred embodiments of the mobile cattle hospital the trailer is hydraulically operated such that for relocation it is raised and appears as a typical trailer, but when placed proximate to a pen of cattle for working the trailer sits on the ground, thus minimizing the vertical distance the cattle must traverse before entering the squeeze chute.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims; the terms "including" and "comprising" are used in an open-ended fashion, and thus should be interpreted to mean "including, but not limited to . . . ". Also, the term "connect" or "connects " is intended to mean either an indirect or direct mechanical connection. Thus, if a first device connects to a second device, that connection may be through a direct mechanical connection, or through an indirect mechanical connection via other devices. Further, the term connected could mean a rigid connection, but may also comprise hinged connections.

DETAILED DESCRIPTION OF THE PREFERRED EMBODIMENTS

The preferred embodiments of the present invention were developed in the context of treating cattle in a feedlot, and will be described in that context; however, this description should in no way be considered limiting as to other applications of such a mobile treatment facility, such as in the raising of hogs, sheep, dairy cattle and the like.

Figure 1:
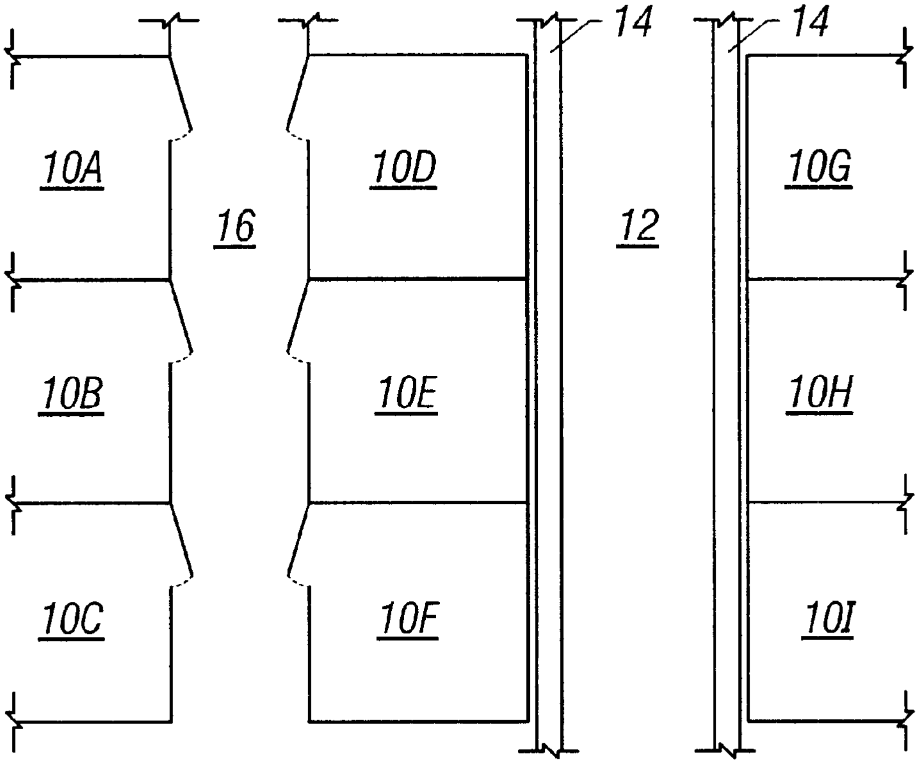
FIG. 1 shows an overhead view of a cattle feeding operating.
Figure 2:
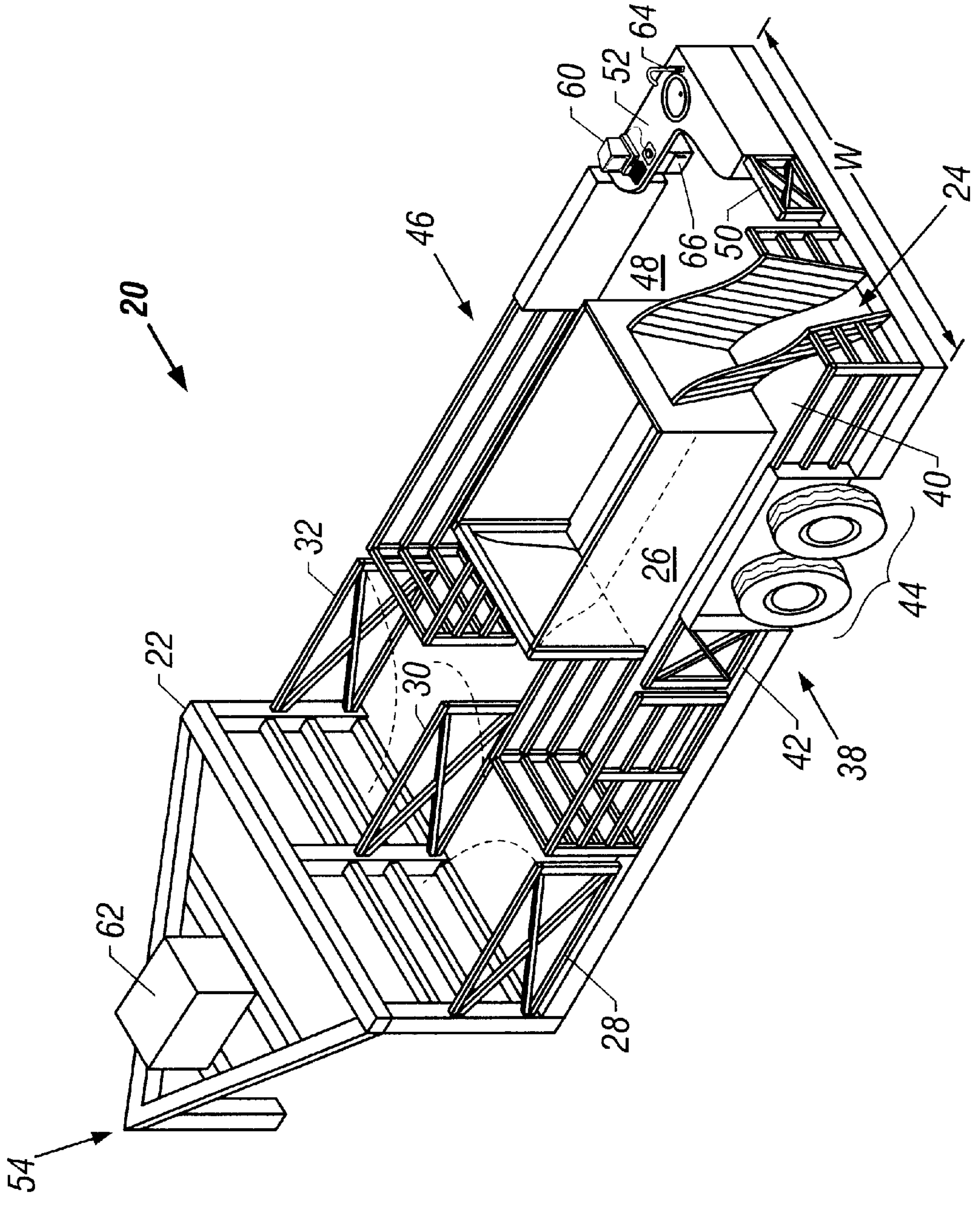
FIG. 2 shows a perspective view of the mobile cattle hospital of the preferred embodiment.

FIG. 2 shows a perspective view of the preferred arrangement for the mobile cattle hospital 20. In particular, the base structure of the mobile cattle hospital is a gooseneck trailer 22. While it may be possible to build a mobile cattle hospital on a commercially available gooseneck trailer, in the preferred embodiments the trailer 22 has a width (W in the figure) of 12 feet, significantly wider than commercial gooseneck trailers for highway use, but slightly less than the standard 16 feet width of the alley 16 (FIG. 1) of most commercial feedlots.

Working cattle using the mobile cattle hospital of the preferred embodiment preferably involves forcing cattle, in single file, into the snake or offset walkway 24. The offset walkway 24 leads from the back of the trailer 22 to the squeeze chute 26. The offset walkway 24 is curved in an "S" shape in order to ease the cattle's progression. Likewise, the offset walkway 24 has a substantially "V" shape with the smaller portion being near the floor of the trailer 22 and the larger portion being near the top.

In the perspective view of FIG. 2, the squeeze chute 26 is shown only in rough outline. As one of ordinary skill in the art is aware, a squeeze chute is a device whereby a single animal is confined, within a "V" shaped structure. Once the single animal is confined, the V closes slightly to immobilize the animal, hence the term "squeeze chute", so that treatment may be performed. Some squeeze chutes also have the capability of rotating about a horizontal axis, especially to allow treatment of hooves and the like. Any suitable squeeze chute may be used, but the preferred embodiment comprises a squeeze chute manufactured by C&S of Sublette, Kansas. Once the treatment is complete, the animal is allowed to leave the squeeze chute 26, continuing in a forward direction. In the preferred embodiments, the animal may exit the mobile cattle hospital either to the left or the right, as viewed from the back of the trailer 22 facing forward, by selective positioning of the gates 28, 30 and 32.

Figure 3A:
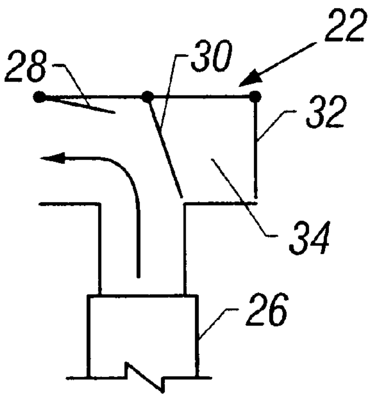
FIG. 3A shows an arrangement of gates to allow cattle to exit the trailer.
Figure 3B:
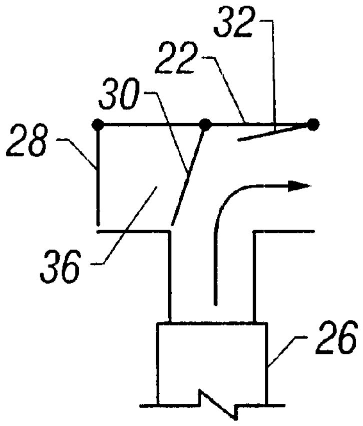
FIG. 3B shows a second arrangement of gates to allow the cattle to exit the trailer.

FIG. 3A shows one arrangement for the gates 28, 30 and 32 whereby an animal leaving the chute 26 exits to the left of the trailer 22. Allowing cattle to depart the squeeze chute with the gates as shown in FIG. 3A makes a small holding pen 34 between the center gate 30 and the right-hand gate 32. FIG. 3B shows yet another configuration of the gates 28, 30 and 32 in which the animal leaving the squeeze chute 26 is allowed to exit to the right of the trailer 22, and in this case a small holding pen 36 is created by the position of the gates 28 and 30. These holding pens 34, 36 allow, for example, holding cattle that need to be segregated because of illness and the like.

Referring again to FIG. 2, the preferred embodiments allow access to the squeeze chute along both sides. In particular, on the left side 38, access may be had to the squeeze chute 26 by walkway 40. Access to walkway 40 in the preferred embodiments is by way of gate 42. While gate 42 is shown in front of the wheels 44, the gate 42 may be equivalently placed at any location, or not included at all, and these variations would be within the contemplation of this invention. Likewise, on the right side of the trailer 46, a walkway 48 exists alongside the squeeze chute 26. Access to walkway 48 preferably takes place through gate 50. Again, however, one of ordinary skill in the art could devise many equivalent locations for the gate to access the walkway 48, and all of these would be within the contemplation of this invention. Generally speaking, the walkways 40 and 48 are isolated from the cattle by means of a plurality of fence-like panels (not specifically numbered) shown on the outer edge of the trailer 22.

Preferably the mobile cattle hospital 20 has cabinet space 52, in the preferred embodiments located at the back right-hand side of the trailer. This cabinet space 52 preferably houses a computer 60 and related accessories, and also acts as working space for the persons performing treatment on the animals as they move through the squeeze chute 26. The mobile cattle hospital 20 of the preferred embodiment also comprises an electrical power-generator preferably placed on the tongue section 54 of the trailer 22, which provides power for lights (not shown), the computer 60 and any other electrically operated devices, such as electric saws for de-horning operations. The preferred embodiments also comprise a sink 64 in the cabinet area 52, along with corresponding water tanks for storage of water for use with the sink. Moreover, many of the medicines given to cattle musts be refrigerated, and thus the mobile cattle hospital of the preferred embodiment also comprises a refrigerator 66, preferably located beneath the cabinet 52.

As one of ordinary skill in the art is aware, cattle, and possibly other animals, tend to resist movement if that movement involves climbing or descending steep slopes. The mobile cattle hospital 20 is preferably situated proximate to the pen of interest by rolling on wheels 44, which implies that the frame of the trailer 22 may be several inches or even feet off the ground to accommodate relocation. Once in place, the frame of the trailer 22 is adapted to rest substantially on the ground, thus requiring the cattle only to climb a vertical distance of only a few inches to be on the working deck on the same plane as walkways 40 and 48.

Figure 4A:
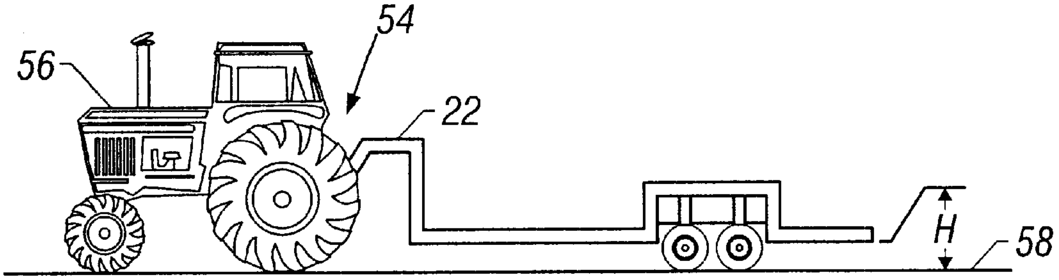
FIG. 4A shows the trailer of the preferred embodiments in its raised configuration.
Figure 4B:
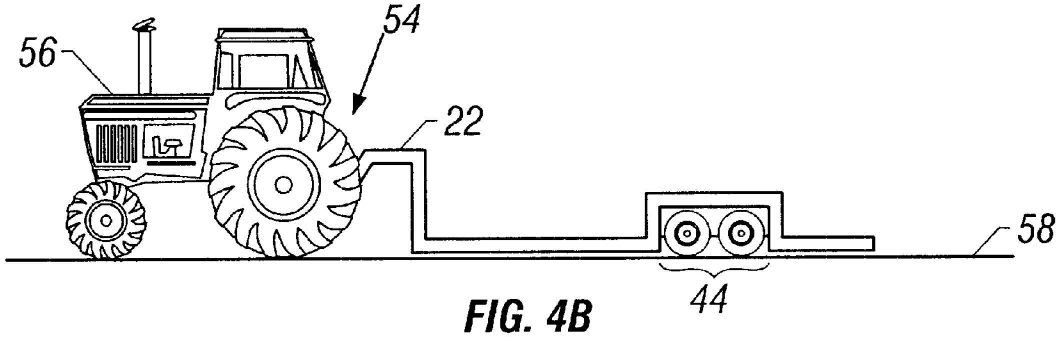
FIG. 4B shows the trailer 22 of the preferred embodiments in its lowered configuration.

FIGS. 4A and 4B show an elevational side view of the mobile cattle hospital 20 of the preferred embodiments with the various components mounted on the trailer not shown for clarity of the figure. In particular, FIG. 4A shows the trailer 22 mechanically connected to a tractor 56 and having a height H above the ground. Preferably, the mobile cattle hospital 20 is moved from place to place while in the raised configuration. Likewise, FIG. 4B shows the trailer 22 sitting substantially on the surface of the ground 58. Referring somewhat simultaneously to FIGS. 2 and 4B, in the preferred embodiments, the cattle need merely traverse the relatively small vertical distance (approximately twelve inches) from the ground 58 to the horizontal plane that comprises the walkways 40 and 480A, as well as the bottom of the offset walkway 24. Preferably, a ramp hinges to the back of the trailer 22 and extends outward, minimizing slope of the path traveled by the cattle. The ramp, as well as a series of panels for creation of a squeeze pen, are discussed more fully below.

Referring still generally to FIGS. 4A and 4B, in the preferred embodiments the mobile cattle hospital 20 is moved from place to place by means of the tractor 56. Because in the preferred embodiments the trailer 22 sits substantially on the ground along its length, not only do the wheels 44 of the preferred embodiment selectively move up and down to raise and lower the trailer, but also the tractor 56 correspondingly raises and lowers the tongue 54. Raising and lowering the trailer of the preferred embodiments takes place by hydraulically operating the wheels 44 of the trailer 22.

Figure 5A:
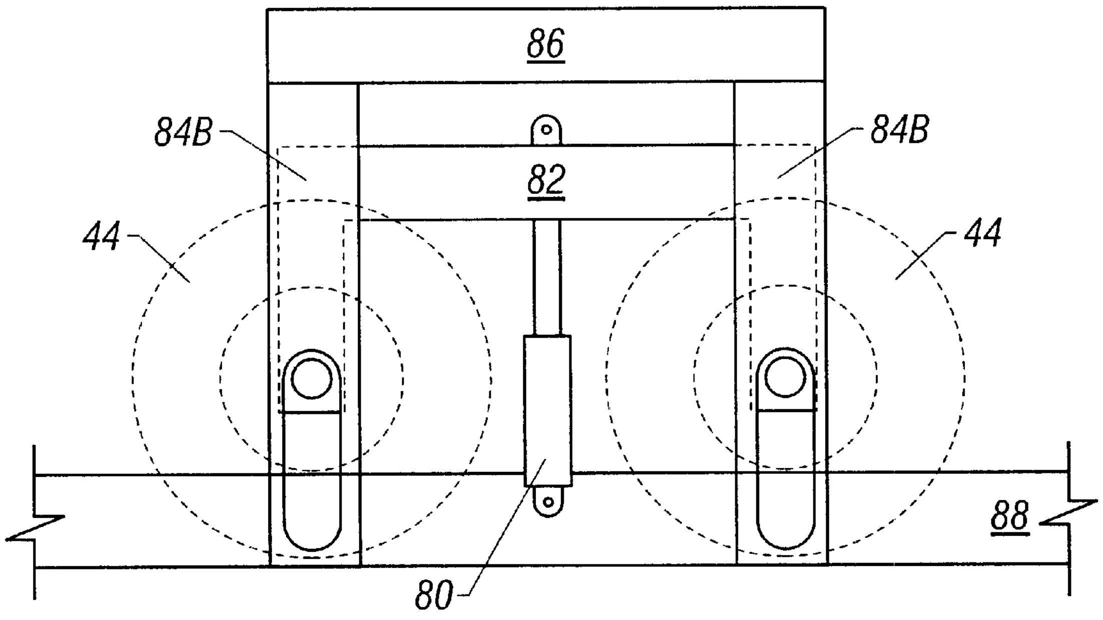
FIG. 5A shows the preferred arrangement for raising and lowering the wheels of the trailer, in the lowered configuration.
Figure 6:
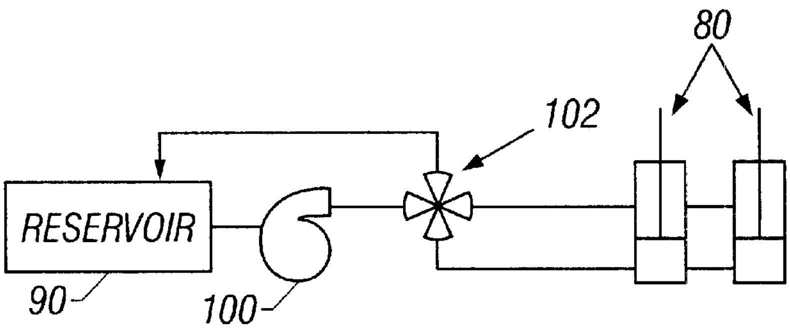
FIG. 6 shows an exemplary hydraulic system to perform raisins and lowering operations of the preferred embodiments.

FIG. 5A shows the preferred lifting structure for one set of wheels 44. In particular, FIG. 5A shows the wheels 44 in their raised or retracted position. Preferably, a hydraulic cylinder 80 acts to raise and lower the wheels on one side of the trailer. Thus, in the preferred embodiments, there will be a hydraulic cylinder 80 associated with each set of wheels 44. The hydraulic cylinder 80 mechanically connects to movable member 82. Movable member 82 comprises a substantially horizontal component, as well as two substantially vertical components 84A, B, which mechanically couple to the wheels 44. The wheels 44 are rotatably coupled to the movable member 82. Each of the substantially vertical portions 84A, B of the movable member 82 are slidingly within the stationary structure 86, which preferably connects to the frame 88 of the trailer 22. Figure SB shows the preferred implementation with the wheels 44 in their down or extended orientation. Preferably, cylinder 80 pulls the movable member 82 downward (which then raises the trailer 22 upward) such that the wheels 44 contact the ground 58 and raise the trailer. FIG. 6 shows an exemplary hydraulic system setup to perform this raising and lowering operation in the preferred embodiments. In particular, a pump 100 preferably takes sections from a reservoir 90. The pump feeds a valve system 102, which then fluidly couples the hydraulic fluid, under pressure of the pump 100, to the appropriate side of the cylinders 80. The preferred arrangement is having the cylinders operate in parallel from a single source. As hydraulic fluid enters one side of the parallel operating sets of cylinders 80, the fluid is allowed to exit the other side, through the valve system 102, and is allowed to flow back to the reservoir 90. Lowering the trailer 22 of the preferred embodiment involves forcing fluid into the cylinders 80 such that the cylinders extend in length, again by forcing fluid into one side of the hydraulic cylinder while allowing fluid from the second side to return to the reservoir 90.

As depicted in FIGS. 4A, B, preferably the trailer 22 mechanically couples to a tractor 56 for movement about the feed lot and placement proximate to a pen of cattle that need treatment. In the preferred embodiments, the reservoir 90, hydraulic pump 100 and valving arrangement 102 are all an integral part of the tractor 56; however, it would be an operable system to have an independent reservoir 90, pump 100 and valving system 102 mounted on the trailer such that raising and lowering could be accomplished without the aid of a tractor 56, and thus moving the trailer 22 from location to location could be done with some other vehicle, such as a truck. The hydraulic pump 100, in this circumstance, could be gasoline operated, operated from the alternating current generated by the preferred electrical generator 62, or could operate from battery power. Alternatively, the truck used to relocate the trailer could have a power-take-off (PTO) unit capable of providing hydraulic fluid under pressure.

Figure 5B:
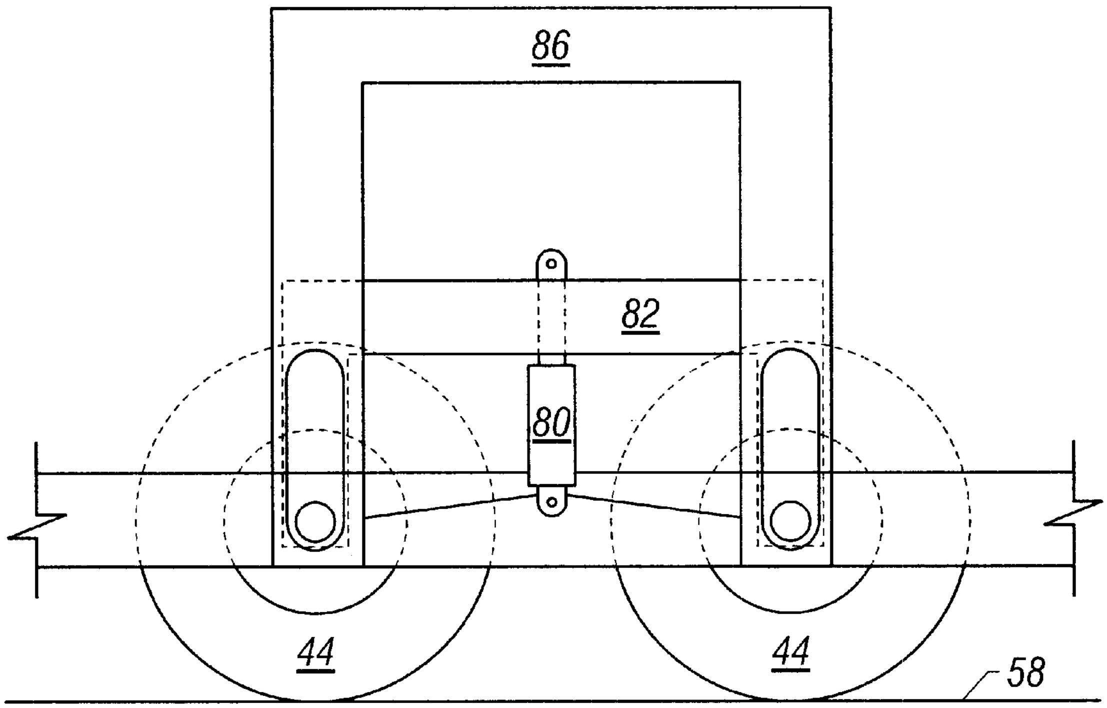
FIG. 5B shows the preferred arrangement for raising and lowering the trailer, in the raised configuration.
Figure 7A:
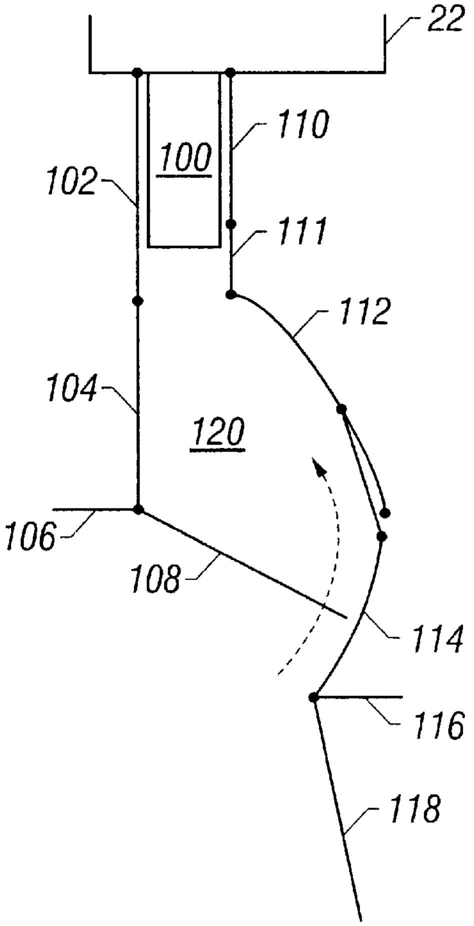
FIG. 7A shows an overhead view of the various panels mechanically connected to the back of the trailer to form a squeeze pen.

As mentioned above, the mobile cattle hospital 20 of the preferred embodiment also has a ramp leading to the offset walkway 24 and a series of panels connected to the back of the trailer 22 for on-location creation of a squeeze pen. Referring now to FIG. 7A, there is shown an overhead view of the relationship of the ramp that leads to the offset walkway 24, as well as the various panels connected to the back of the trailer that form the mobile squeeze pen. In particular, FIG. 7A shows ramp 100. Ramp 100 is preferably hinged to the back of the trailer 22, and extends from a surface substantially parallel to the walkways 40, 48 to ground level 58 (not shown in FIG. 7A). In the preferred operation where the mobile cattle hospital 20 sits substantially on the ground across its entire length, the vertical distance traversed by the ramp 100 is preferably only twelve inches or less (the vertical height of the frame of the trailer 22). However, in circumstances where the mobile cattle hospital 20 is operated in a working alley having a slope, it is possible that this distance could increase, but it is minimized by the fact that the trailer 22 sits substantially on the ground as described with respect to FIGS. 4 and 5.

Figure 7B:
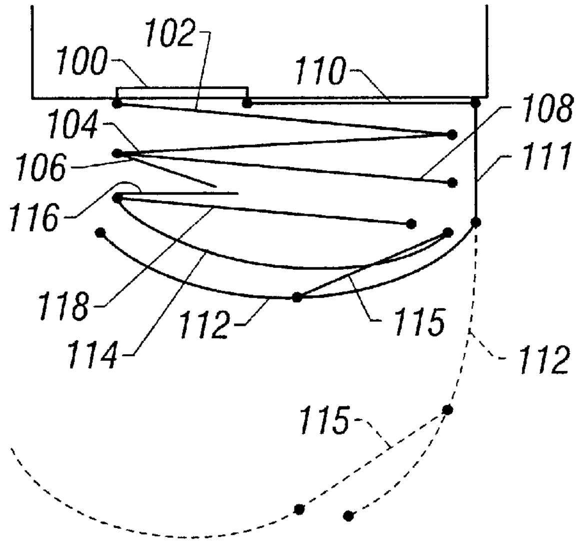
FIG. 7B shows the various panels of the squeeze pen in their folded configuration.

Preferably, the mobile cattle hospital 20 has a series of fence panels mechanically connected to the back of the trailer 22. The overhead view of FIG. 7A shows those various fence panels in their extended position. In particular, along one side a series of two individual straight panels 102 and 104 couple to the back of the trailer 22. Because it is envisioned that the mobile cattle hospital 20 of the preferred embodiments may not be operated on entirely flat surfaces, not only are these panels hinged to fold away from the trailer 22, but are also hinged to allow up and down movement to accommodate the particular terrain. In particular, panel 102 hinges to the trailer 22, and panel 104 hinges to the panel 102. A short panel 106 preferably hinges to panel 104, and provides stability for gate panel 108. Preferably, panel 108 is hinged to panels 104 and 106 such that it can swing through at least an arc of ninety degrees. On the other side of the ramp 100, a third and fourth straight panel 110, 111 preferably hinge to the trailer 22. Two curved panels 112 and 114 preferably hinge to each other and to panel 111. Short panel 116 is preferably hinged to panel 114, panel 116 providing horizontal support for the squeeze pen. Finally, panel 118 preferably hinges to panels 114 and 116 to direct the cattle into the squeeze pen portion of the panels. As indicated in FIG. 6, panel or gate 108 preferably swings within the area partially bounded by panels 112 and 114, such in this set up a squeeze pen area 120 is created within the area bounded by the panels 104, 108, 112 and 114, with the cattle being forced up ramp 100 to the offset walkway 24 (not shown in FIG. 6). FIG. 7B shows the various fence panels 102–118 in their folded configuration, which is the preferred setup when the trailer is being relocated from pen to pen. As can be seen in FIG. 7B, the various straight fence panels 102, 104 and 110 fold up to be substantially parallel to the width of the trailer. Short panel 111 folds to be substantially parallel to the length of the trailer with circular panels 112 and 114 folding in on themselves to be the outermost panels, straight panel 118 and short panel 116 folding within the setup to be substantially parallel to the remaining fence panels 102, 104 and 110. Preferably, the curved fence panel 112 and curved fence panel 114 coupled by way of an arm coupled substantially in the center of panel 112 and hinged to the end of the curved panel 114. In this way, the two curved panels 112 and 114 hinge to be substantially coaxial in the folded position. FIG. 7B shows the relationship of panels 112, 114 and arm 115 in a partially folded configuration to show the relationship of these various components.

Thus, the preferred embodiments comprise all the necessary equipment to perform cattle treating operations proximate to the pen of cattle, rather than having to move those cattle significant distances for cattle treating operations. Further, the trailer 22 of the preferred embodiments is adapted to sit on the ground during treating operations, thus minimizing the vertical distance that the animals must climb when entering or exiting the trailer 22. Additionally, the mobile cattle hospital 20 of the preferred embodiments comprises the series of fence panels which are used to create a mobile squeeze pen for forcing the cattle through the offset walkway 24.

The above discussion is meant to be illustrative of the principles and various embodiments of the present invention. Numerous variations and modifications will become apparent to those skilled in the art once the above disclosure is fully appreciated. For example, the mechanism for raising the lowering the wheels 44 shown in FIGS. 5A, B is the preferred embodiment; however, one of ordinary skill in the art now understanding how the trailer 22 of the preferred embodiment raises and lowers could device many equivalent systems for performing this task, such as air filled bladders, air operated shocks, mechanical (non-hydraulic) means such as motor operated jacks, and the like. It is intended that the following claims be interpreted to embrace all such variations and modifications.

What is claimed is:

1. In large scale animal feeding operations in which the animals reside in pens, each pen proximate to a working alley, a method of treating the pen of animals comprising:

situating a trailer in the working alley proximate to the pen of animals and wherein the trailer comprises at least one feature selected from the group of a sink, a computer and a refrigerator mounted on the trailer;

lowering the trailer such that at least a portion of a frame of the trailer sits at ground level; and working the animals through a squeeze chute mounted on the trailer.

2. The method of treating the pen of animals as defined in claim 1 wherein situating a trailer in the working alley proximate to the pen of animals further comprises pulling the trailer with a tractor to a location proximate to the pen of animals.

3. The method of treating the pen of animals as defined in claim 1 wherein situating a trailer in the working alley proximate to the pen of animals further comprises pulling the trailer with a truck to a location proximate to the pen of animals.

4. The method of treating the pen of animals as defined in claim 3 wherein lowering the trailer such that at least a portion of a frame of the trailer sits at ground level further comprises operating a hydraulic system on the trailer which raises wheels of the trailer.

5. The method of treating the pen of animals as defined in claim 3 wherein lowering the trailer such that at least a portion of a frame of the trailer sits at ground level further comprises:

supplying hydraulic fluid under pressure from a power-take-off unit of the truck; and raising wheels of the trailer relative to the trailer under using the hydraulic fluid from the truck.

6. The method of treating the pen of cattle as defined in claim 1 further comprising, prior to the working step:

creating a squeeze pen proximate to a back of the trailer from portable fence panels; and forcing animals from the pen of animals into the squeeze pen.

7. The method of treating the pen of animals as defined in claim 6 wherein creating a squeeze pen proximate to a back of the trailer from portable fence panels further comprises unfolding a plurality of fence panels connected to a back of the trailer which, when unfolded, create the squeeze pen.

8. The method of treating the pen of animals as defined in claim 1 further comprising arranging a series of gates on an exit end of the squeeze chute to selectively allow animals to exit the trailer from one of a first side and second side.

9. A method of treating cattle comprising:

pulling a trailer to be proximate to the cattle and wherein the trailer comprises at least one of a sink a computer and a refrigerator mounted on the trailer;

raising wheels of the trailer such that at least a portion of a frame of the trailer sits at ground level; and treating the cattle, one at a time, utilizing a squeeze chute mounted on the trailer.

10. The method of treating cattle as defined in claim 9 wherein pulling a trailer to be proximate to the cattle further comprises pulling the trailer with a tractor to a location proximate to the cattle.

11. The method of treating cattle as defined in claim 9 wherein pulling a trailer to be proximate to the pen of cattle further comprises pulling the trailer with a truck to a location proximate to the cattle.

12. The method of treating cattle as defined in claim 11 wherein raising wheels of the trailer such that at least a portion of a frame of the trailer sits at ground level further comprises operating a hydraulic system on the trailer which raises the wheels of the trailer.

13. The method of treating cattle as defined in claim 11 wherein raising wheels of the trailer such that at least a portion of a frame of the trailer sits at ground level further comprises:

supplying hydraulic fluid under pressure from a power-take-off unit of the truck; and raising wheels of the trailer relative to the trailer using the hydraulic fluid from the truck.

14. The method of treating cattle as defined in claim 9 further comprising, prior to the treating step:

unfolding a plurality of fence panels connected to a back of the trailer to create a squeeze pen; and placing the cattle into the squeeze pen.

15. The method of treating cattle as defined in claim 9 further comprising arranging a series of gates on an exit end of the squeeze chute to selectively allow cattle to exit the trailer from one of a first side and second side of the trailer.

16. A method of working cattle in feedlot operations using a trailer comprising:

using a trailer having a frame that is selectively raised for transport of the trailer, and lowered for use in working cattle;

using a squeeze chute mounted on the trailer;

using a set of gates mounted on the trailer, wherein positioning of the set of gates selectively allows cattle to exit one of two directions, and wherein the positioning of the gates also creates a holding pen on the trailer;

using a refrigerator mounted on the trailer;

using a sink mounted on the trailer;

using a computer mounted on the trailer; and using a collapsible squeeze pen mounted on a back of the trailer, wherein in an unfolded position the squeeze pen defines an area, and wherein in a folded position the area of the squeeze pen is substantially zero.

17. The method as defined in claim 16 wherein using a collapsible squeeze pen mounted on a back of the trailer further comprises using a plurality of semi-circular fence panels, wherein the plurality of semi-circular fence panels are hinged such that in an unfolded position the plurality of semi-circular fence panels at least partially defines the area.

18. The method as defined in claim 17 wherein using a plurality of semi-circular fence panels further comprises using a first and second semi-circular fence panels, and wherein an arm hingedly couples from substantially the center of a first fence panel to substantially an end of the second fence panel.

19. The method as defined in claim 16 wherein using a set of gates mounted on the trailer further comprises:

using a first gate hingedly coupled to the trailer to allow egress of the cattle from the trailer on a first side;

using a second gate hingedly coupled to the trailer to allow egress of the cattle from the trailer on a second side; and using a third gate hingedly coupled to the trailer, wherein when the first gate is opened to allow egress from the first side the holding pen is defined in part by the second and third gate, and wherein when the second gate is open to allow egress from the second side the holding pen is defined in part by the first and third gates.

* * * * *